(12) United States Patent
Goel

(10) Patent No.: US 11,134,217 B1
(45) Date of Patent: Sep. 28, 2021

(54) SYSTEM THAT PROVIDES VIDEO CONFERENCING WITH ACCENT MODIFICATION AND MULTIPLE VIDEO OVERLAYING

(71) Applicant: Surendra Goel, Mclean, VA (US)

(72) Inventor: Surendra Goel, Mclean, VA (US)

( * ) Notice: Subject to any disclaimer, the term of this patent is extended or adjusted under 35 U.S.C. 154(b) by 0 days.

(21) Appl. No.: 17/145,842

(22) Filed: Jan. 11, 2021

(51) Int. Cl.
| | |
|---|---|
| *H04N 7/15* | (2006.01) |
| *G11B 27/031* | (2006.01) |
| *G11B 27/00* | (2006.01) |
| *G06K 9/00* | (2006.01) |
| *G06F 40/58* | (2020.01) |
| *H04N 5/265* | (2006.01) |

(52) U.S. Cl.
CPC ............. *H04N 7/15* (2013.01); *G06F 40/58* (2020.01); *G06K 9/00281* (2013.01); *G06K 9/00302* (2013.01); *G11B 27/007* (2013.01); *G11B 27/031* (2013.01); *H04N 5/265* (2013.01)

(58) Field of Classification Search
CPC ........ H04N 7/15; H04N 5/265; G11B 27/031; G11B 27/00; G06F 40/58; G06K 9/00
USPC ........................................ 348/14.01–14.16
See application file for complete search history.

(56) References Cited

U.S. PATENT DOCUMENTS

| | | |
|---|---|---|
| 7,626,569 B2 | 12/2009 | Lanier |
| 8,964,298 B2 | 2/2015 | Haddick et al. |
| 9,743,119 B2 | 8/2017 | Todd |
| 9,916,538 B2 | 3/2018 | Zadeh et al. |
| 10,264,214 B1 | 4/2019 | Kumar |
| 10,505,998 B1 | 12/2019 | Ackerman et al. |
| 10,594,757 B1 | 3/2020 | Shevchenko et al. |
| 2005/0007965 A1 | 1/2005 | Hagen et al. |
| 2005/0254440 A1 | 11/2005 | Sorrell |
| 2010/0037151 A1 | 2/2010 | Ackerman et al. |
| 2012/0069131 A1 | 3/2012 | Abelow |
| 2012/0290950 A1 | 11/2012 | Rapaport et al. |
| 2013/0066750 A1 | 3/2013 | Siddique et al. |
| 2013/0215116 A1 | 8/2013 | Siddique et al. |
| 2013/0216206 A1 | 8/2013 | Dubin et al. |
| 2013/0242031 A1* | 9/2013 | Petterson ........... G06K 9/00228 348/14.07 |
| 2014/0362165 A1 | 12/2014 | Ackerman et al. |

(Continued)

FOREIGN PATENT DOCUMENTS

| | | | |
|---|---|---|---|
| BR | 102014005943 A2 | 11/2014 | |
| BR | 102015005929 A2 | 10/2016 | |

(Continued)

*Primary Examiner* — Melur Ramakrishnaiah
(74) *Attorney, Agent, or Firm* — Karthik Murthy; Murthy Patent Law PLLC

(57) ABSTRACT

A system that provides video conferencing, comprising: an option to modify an accent of a user from an original accent to a preferred accent of another user; an option to merge live video streams of each user into one viewable stream such that each user appears sitting next to each other with a variety of possible backgrounds and seats; an option for each user to only share part of their screen as opposed to their whole screen; an option for each user to change the clothing of each user such that it appears the user is wearing different clothing of their choice; an option for each user to choose the frame that each user is displayed in, such that the user is not stuck in a frame that the user does not want to be in; and an option for each user to display a video on loop.

3 Claims, 11 Drawing Sheets

(56) References Cited

U.S. PATENT DOCUMENTS

| | | |
|---|---|---|
| 2015/0033153 A1 | 1/2015 | Knysz et al. |
| 2015/0070516 A1 | 3/2015 | Shoemake et al. |
| 2015/0077511 A1* | 3/2015 | Mihara .................. H04N 7/147 |
| | | 348/14.12 |
| 2016/0210602 A1 | 7/2016 | Siddique et al. |
| 2017/0048490 A1* | 2/2017 | Martinez ................ H04N 7/147 |
| 2017/0105053 A1 | 4/2017 | Todd |
| 2017/0302709 A1* | 10/2017 | Jones .................. G06Q 10/109 |
| 2018/0204111 A1 | 7/2018 | Zadeh et al. |
| 2018/0241930 A1* | 8/2018 | Eisses ...................... H04N 7/15 |
| 2018/0316939 A1 | 11/2018 | Todd |
| 2018/0316940 A1 | 11/2018 | Todd |
| 2018/0316941 A1 | 11/2018 | Todd |
| 2018/0316942 A1 | 11/2018 | Todd |
| 2018/0316943 A1 | 11/2018 | Todd |
| 2018/0316944 A1 | 11/2018 | Todd |
| 2018/0316945 A1 | 11/2018 | Todd |
| 2018/0316946 A1 | 11/2018 | Todd |
| 2018/0316947 A1 | 11/2018 | Todd |
| 2018/0316948 A1 | 11/2018 | Todd |
| 2019/0121522 A1 | 4/2019 | Davis et al. |
| 2019/0238952 A1 | 8/2019 | Boskovich |
| 2019/0289258 A1* | 9/2019 | Peterson ............ G06K 9/00268 |
| 2020/0184278 A1 | 6/2020 | Zadeh et al. |
| 2020/0193972 A1* | 6/2020 | Er .......................... G06N 20/10 |
| 2020/0358983 A1* | 11/2020 | Astarabadi ......... G06K 9/00281 |
| 2021/0076002 A1* | 3/2021 | Peters .................... H04N 7/147 |

FOREIGN PATENT DOCUMENTS

| | | |
|---|---|---|
| CN | 101918937 A | 12/2010 |
| CN | 103270750 B | 1/2018 |
| GB | 2319135 A | 5/1998 |
| IN | 2008DN10288 A | 8/2010 |
| IN | 2011KN03460 A | 3/2012 |
| JP | 2010529738 A | 8/2010 |
| JP | 4539048 B2 | 9/2010 |
| KR | 20020065091 A | 8/2002 |
| KR | 102056807 B1 | 12/2019 |
| NL | 2020989 B1 | 12/2019 |
| TW | 200400764 A | 1/2004 |
| TW | 200949567 A | 12/2009 |
| TW | 200951728 A | 12/2009 |
| WO | 2018071781 A2 | 4/2018 |
| WO | 2019191082 A2 | 10/2019 |
| WO | 2019226051 A1 | 11/2019 |

* cited by examiner

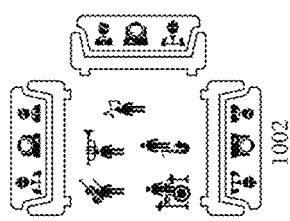
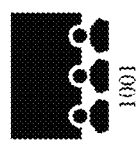
FIG. 10

US 11,134,217 B1

SYSTEM THAT PROVIDES VIDEO CONFERENCING WITH ACCENT MODIFICATION AND MULTIPLE VIDEO OVERLAYING

FIELD OF THE INVENTION

The present invention relates to video conferencing with accent modification and multiple video overlaying.

BACKGROUND

The background description includes information that may be useful in understanding the present invention. It is not an admission that any of the information provided herein is prior art or relevant to the presently claimed invention, or that any publication specifically or implicitly referenced is prior art.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties Such as concentration, reaction conditions, and so forth, used to describe and claim certain embodiments of the invention are to be understood as being modified in some instances by the term "about."

Accordingly, in some embodiments, the numerical parameters set forth in the written description and attached claims are approximations that can vary depending upon the desired properties sought to be obtained by a particular embodiment.

In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an and "the includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "Such as") provided with respect to certain embodiments herein is intended merely to better illuminate the invention and does not pose a limitation on the scope of the invention otherwise claimed.

No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any Such inclusion or deletion occurs, the specification is herein deemed to contain the group as modified thus fulfilling the written description of all Markush groups used in the appended claims.

Today, videoconferences are relatively boring, one reason for that is the user does not have much control. Due to the coronavirus pandemic and increased telecommuting, videoconferences are more common today than ever. However, there are still so many technical issues and lack of features that prevent the user from enjoying the experience.

For example, the user is forced to share their entire screen, when they might not want to do that. The user is shown as disconnected from the other users in separate boxes. The user might be in pajamas even though they don't want to appear that way in the videoconference. The user might have an accent that is difficult to understand by the other participants in the videoconference.

This makes videoconferencing a difficult experience, and a poor substitute for a real life gathering.

SUMMARY

The present invention solves these issues, because the present invention makes videoconferencing more fun. The present invention allows for partial screen sharing, so a user can keep something on their screen, but not share it with others in the videoconference. The present invention can merge the appearance of users so that it appears they are sitting together, instead of being separated into separate boxes. The present invention can digitally change the clothes of a user, so the user need not get out of their pajamas, but can still be seen wearing a formal suit in the videoconference.

Furthermore, the present invention has the functionality to modify an accent from one version to another, in realtime, so as to be more easily understandable by other participants in the videoconference who might prefer hearing a different accent.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

FIG. 10 is a drawing showing how the present invention can make the video of multiple users be synced, such that the users can appear in different positions compared to their actual positions, according to various embodiments of the present disclosure.

DETAILED DESCRIPTION

Figure 1:
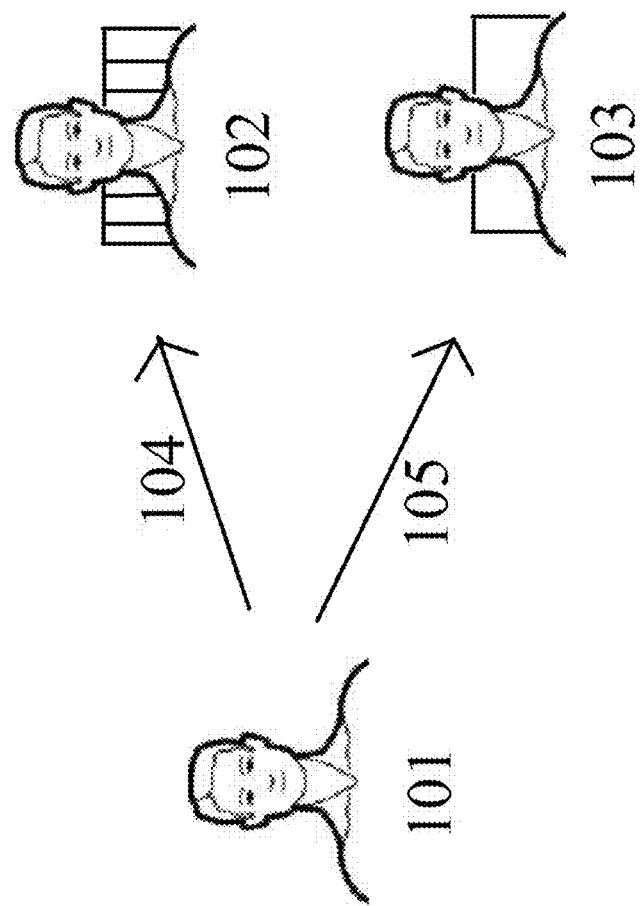
FIG. 1 is a drawing showing how users can be displayed in different chairs or couches, according to various embodiments of the present disclosure.

Various embodiments of the present disclosure relate to providing a system that provides video conferencing with accent modification and multiple video overlaying, as well as multiple other features.

In one embodiment of the invention, the system will merge the video conference with augmented reality so that the system will make the experience feel more real for a participant in the video conference. The experience will feel more real because by wearing augmented reality glasses, a participant will be able to see other people on the video conference as if they were sitting near them, as opposed to in a separate box on a screen.

The system will use a static or real time picture, so that it can play videos of participants in different chairs. There will be a selection of chairs, and a participant can upload their own custom image of a chair as well.

The system can overlay multiple videos so that it appears that people are sitting together in 1 video stream. This allows people to have the feeling that they are sitting together, and that they are more connected. This is in contrast to the reality where people are sitting at home separately, and so people might enjoy the vision of themselves sitting with their fellow video conference participants.

The system can sync between multiple videos, so it can feel like people are together. This will allow people to be seen together in realtime, in the various positions they prefer, so it is not limited to just sitting together, but can be standing together, or seated together around different tables, or some other arrangement.

The system can analyze video in order to see if someone is really paying attention, perhaps by analyzing facial expressions. A few aspects of facial recognition that are considered for this process are whether the cheeks are raised, the tightness of the lid, whether the lip corner is pulled, whether the upper lip is raised, and whether the lips are apart. These are just some potential aspects of facial recognition analysis, and many more may be used as well.

The system can make a person look better by applying different filters to video in realtime. This might include makeup or airtouching or some other display based manipulation that moves along with the face and body of a participant that makes the participant look better. The participant can manipulate and change these effects in realtime until they are satisfied.

The filters can include formal wear in order to be presentable in an interview or for an investor. This is in sharp contrast to how many people might actually dress at home, such as in their pajamas. This will allow those people to appear to be formally dressed in a video conference, when in fact they are not formally dressed.

There can also be funny filters such as bunny ears, sparkles, putting a participant's face in the sun, putting a participant's face on a body underwater, putting a funny sticker on a participant's forehead, putting multiple mouths on a participant's face, putting a short text message on a participant's forehead, putting a participant's face on a dragon breathing fire, putting floating avocados around a participant's head, as well as putting other uploaded images around a participant's head and body.

The filters will function in realtime, and will match the movement of a user in the video conference.

The system will allow a user in a video conference to select the frame the user is being displayed in, giving more control to the user.

The system will allow a user to not mute everyone, if the user only wants to talk to one person.

The system will allow a user to mute people selectively.

The system will allow the user to display a loop video, versus a fixed picture. This may be useful if a participant wants to leave for a short or potentially long time, but doesn't want the other participants to know that they are gone.

The system can have increased security for healthcare purposes. This might include varying levels of encryption, it can also include passwords, it can also include fingerprint identification for each user to enter the video conference. Perhaps in the future it might include retinal identification for each user to enter the video conference. It's possible that it could include scanning some sort of badge for each user to enter the video conference.

The system can change verbal output within the same language from 1 accent to another accent, such as from Australian English to American English in realtime or with a short delay.

The system can change verbal output within the same language from an unidentifiable accent to a neutral accent, such as American English in realtime or with a short delay.

The system can provide video quality enhancement and audio quality enhancement. This may done with software that extrapolates how an image should look based on the existing pixels, and then adding additional pixels so that the image looks the way it might have been intended.

The system can allow users to switch roles regarding being a presenter.

The system can perform auto detection to identify an object seen in the video. Here, a participant can select or draw a line around an object the participant sees in a video conference. Then, an algorithm analyzes the image selected or inside the line, and determines what that image is. This can be done through online searching or machine learning, or a combination of both.

The system allows the user to only share a selected part of the screen via video vs entire desktop or program window. For example, in one embodiment of the present invention: a user only wants to share certain financial information or email contents vs their entire window. A user might do this by holding screen capture like keys and then selecting the area to share. Alternatively a user can select the part of the screen they want to share by clicking and dragging a mouse over that area.

In FIG. 1, one embodiment of the invention is displayed as a drawing showing how users can be displayed in different chairs or couches. The image of the person 101 is taken and transformed through one process 104 such that the image of the person now has a certain kind of chair behind the person 102. The chair retains its position and does not interfere in the appearance of the image of the person 101 while being displayed live in realtime.

Alternatively, the image of the person 101 is taken and transformed through another process 105 such that the image of the person now has another kind of chair behind the person 103. Multiple different types of chairs or couches or other seats could be used in this process, depending on the preferences of the user. Each of the different types of chairs retains its position and does not interfere in the appearance of the image of the person 101 while being displayed live in realtime.

Figure 2A:
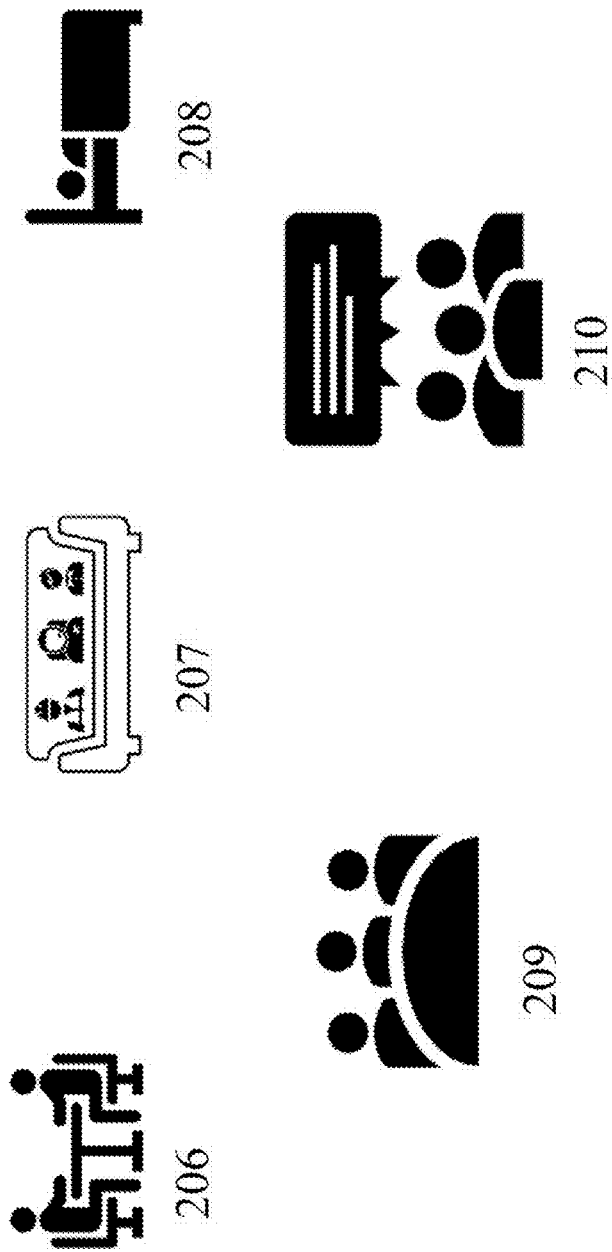
FIG. 2A is a drawing showing according to various embodiments of the present disclosure.

In FIG. 2A, one embodiment of the invention is displayed as a drawing showing different ways that multiple users can be synced, such that the users can appear in different positions compared to their actual positions. For example in image 206, the users are shown sitting across from each other at a table, even though they are likely each sitting in front of their video camera. The system has taken their likeness and made it appear that they are sitting across from each other at a table. If only the head of a user is visible in their video camera, then only the head will move in the image 206, or if more of the body is visible then those parts of the body will move in image 206.

Another example is image 207, in which the users are shown sitting next to each other on a couch, even though they are likely each sitting in front of their video camera. The part of the body that is visible in the camera is the part that moves, and the rest of the body is a fixed image. It's possible that each user can design how the rest of their body looks by canging fixes images, or there could be a set of preselected images.

Another example is image 208, in which only 1 user is shown, but perhaps is representative of how that user is feeling, such as if they are sick or tired. Here, it's possible that only a fixed images is shown and not any moving part of the body, because if the user is sick they might not want to display themselves on screen. However, the user can have the option to display themselves if they want. The image can be shown to all users in the video chat, however, this might prevent each user from displaying themselves. Another option would be for each user to be displayed separately, some normally and some utilizing the image 208.

Another example is image 209, which shows how the videos of multiple users can be synced, such that the users all appear to be sitting next to each other around a table. The visible parts of each user along with part of a fixed image of a body of the user's choosing or a default image is shown around the table. It's possible this could lead to more of a feeling of cooperation or closeness with the other people in the videoconference. Perhaps this could lead to increased productivity or increased focus. It's possible that some people might feel lonely in their house all day and this might relieve some loneliness because they can visualize themselves with other people.

Another example is image 210, which shows how the videos of multiple users can be synced, such that the users are shown next to each other and dialog boxes of their statements are shown above them. Here, only the video image would be shown and no additional fixed body image would be shown. Also, a transcription program would be run such that each user's statements would be converted into written statements, and then those written statements would be displayed in a dialog box above the user who made those statements. This could be helpful if someone on the video conference is either deaf or is hard of hearing. It might also be helpful if the discussion is very technical or complicated, and this could be a system to keep track of exactly what each person is saying. The written statements could be preserved and a transcript of each person's statements could be produced at the end of the call. This could potentially eliminate the need for someone to take minutes, and might even be more accurate than a human attempting to type every word spoken in a meeting.

Figure 2B:
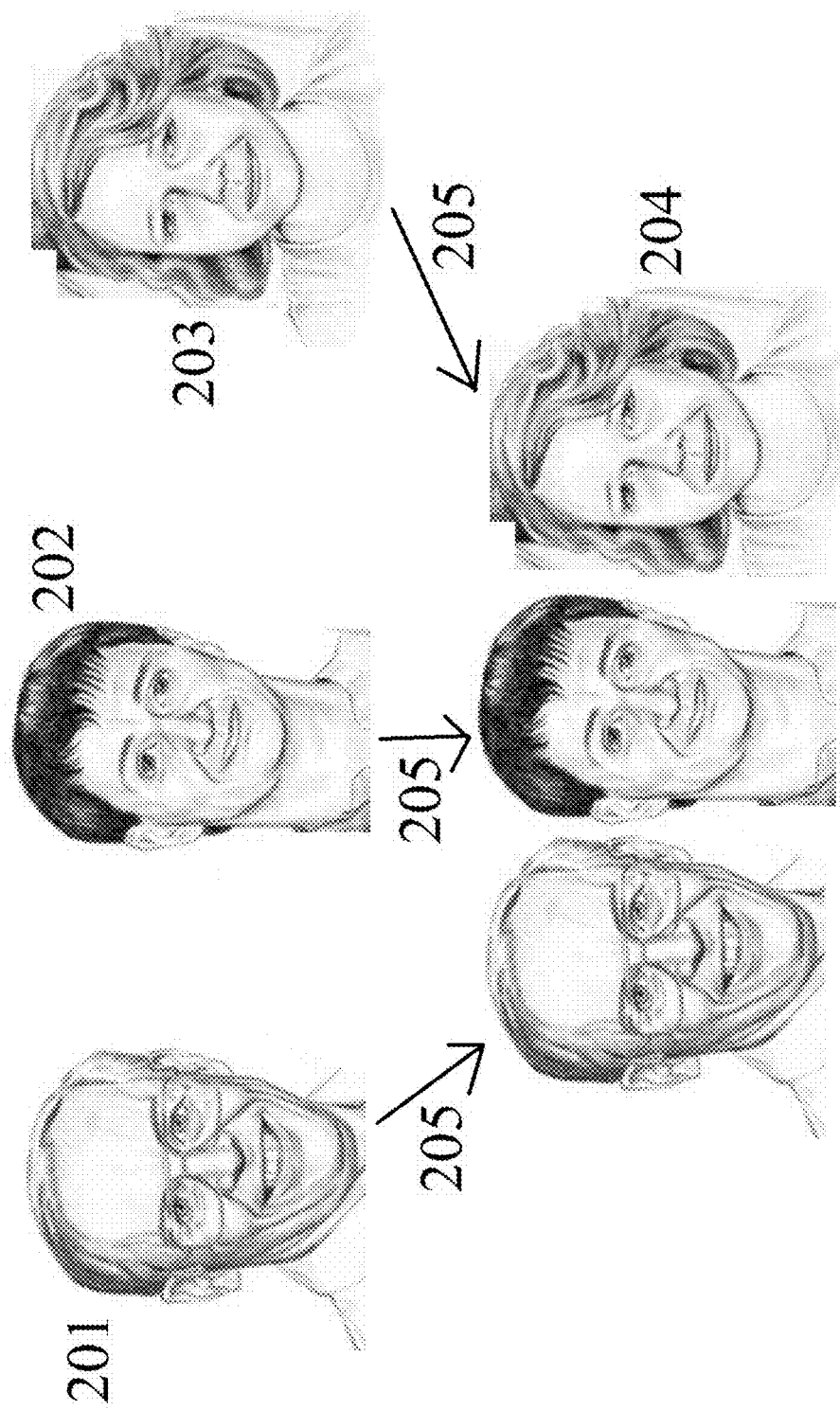
FIG. 2B is a drawing showing how the videos of multiple users can be synced, such that the users all appear to be sitting next to each other, according to various embodiments of the present disclosure.

In FIG. 2B, one embodiment of the invention is displayed as a drawing showing how the videos of multiple users can be synced, such that the users all appear to be sitting next to each other. The images of user 201, user 202 and user 203 are transformed through process 205 such that the images of user 201, user 202 and user 203 now appear to be next to each other live and in realtime as seen in image 204.

Figure 3:
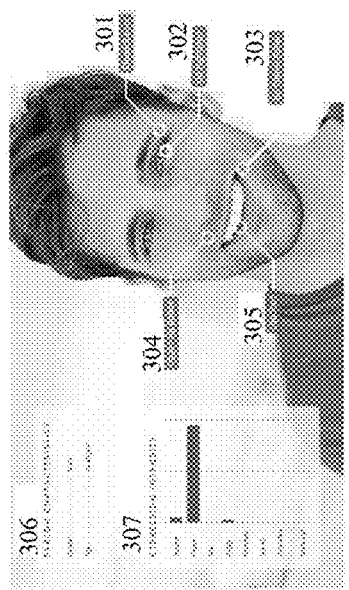
FIG. 3 is a drawing of different aspects of facial recognition utilized by the present invention in order to determine whether a user is paying attention to the meeting or not, according to various embodiments of the present disclosure.

In FIG. 3, one embodiment of the invention is displayed as a drawing of different aspects of facial recognition utilized by the present invention in order to determine whether a user is paying attention to the meeting or not. A few aspects of facial recognition that are considered for this process are whether the cheeks are raised 301, the tightness of the lid 302, whether the lip corner is pulled 303, whether the upper lip is raised 304, and whether the lips are apart 305. These are just some potential aspects of facial recognition analysis, and many more may be used as well.

Some characteristics of the person 306 may be determined by facial recognition or by data entry, and might be used in the analysis of whether the person is paying attention. Expression intensity 307 might also be used in the analysis of whether the person is paying attention. Some different examples of aspects of expression intensity are neutral, happy, sad, angry, surprised, scared, disgusted, and contempt.

Figure 4:
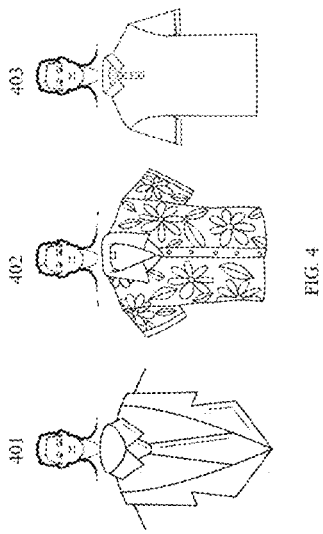
FIG. 4 is a drawing showing how filters can be used to make the clothing of the user appear different, such as making it appear the user is wearing formal wear, according to various embodiments of the present disclosure.

In FIG. 4, one embodiment of the invention is displayed as a drawing showing how filters can be used to make the clothing of the user appear different, such as making it appear the user is wearing formal wear, or a Hawaiian shirt, or a polo shirt. These are just examples, and multiple different types of clothing can be made to appear, depending on the preferences of the user.

Image 401 shows the face and neck of the user along with the top of a formal suit. Image 402 shows the face and neck of the user along with a Hawaiian shirt. Image 403 shows the face and neck of the user along with a polo shirt. Although these examples show a little space between body and shirt, the user can customize the appearance so that it is more fluid with no space in between.

Figure 5:
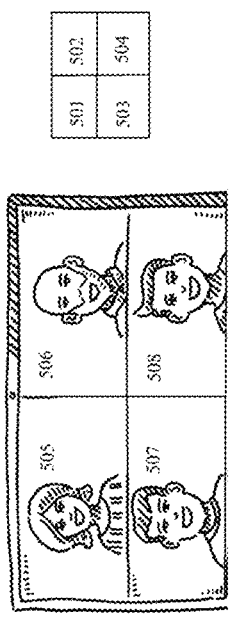
FIG. 5 is a drawing showing how the user can change which frame the user is displayed in within the meeting, according to various embodiments of the present disclosure.

In FIG. 5, one embodiment of the invention is displayed as a drawing showing how the user can change which frame the user is displayed in within the meeting. Let's say the user is user 505 in the upper left corner. However, user 505 actually wants to be in the upper right corner. So user 505 goes to a display panel separate from the video screen and clicks on 502. This will cause her to move to the upper right corner.

In another example, Let's say the user is user 506 in the upper right corner. However, user 506 actually wants to be in the lower right corner. So user 506 goes to a display panel separate from the video screen and clicks on 504. This will cause him to move to the lower right corner.

In another example, Let's say the user is user 507 in the lower left corner. However, user 507 actually wants to be in the upper left corner. So user 507 goes to a display panel separate from the video screen and clicks on 501. This will cause him to move to the upper left corner.

In another example, Let's say the user is user 508 in the lower right corner. However, user 508 actually wants to be in the lower left corner. So user 508 goes to a display panel separate from the video screen and clicks on 503. This will cause her to move to the lower left corner.

Figure 6:
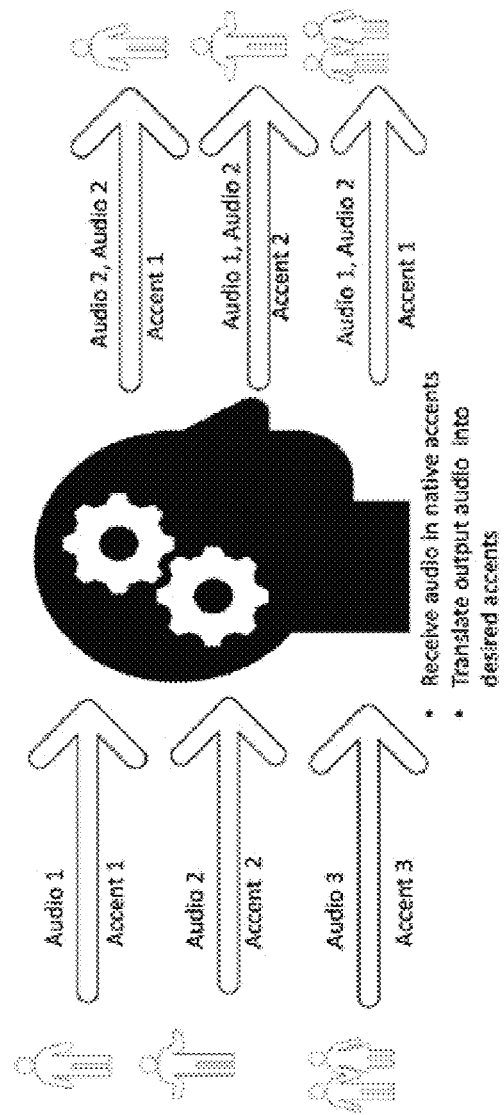
FIG. 6 is a drawing of a flow chart showing the process by which accent modification can take place, according to various embodiments of the present disclosure.

In FIG. 6, one embodiment of the invention is displayed as a drawing of a flow chart showing the process by which accent modification can take place. The first step is to receive audio from each user in each user's native accent. Then each user selects an accent they would like the audio translated into, if any. Then the received audio is translated into each of the selected accents, and each user receives audio in the accent that they selected, if any. Even within English there are numerous accents, such as American, British, Indian and Australian, so conversions between these accents could occur. This could be done by having every word in English in each of these accents, and then analyzing the received audio by parsing each word in the received audio. Then each word would be translated into the selected accent, and an output stream of the translated version would be sent to the users who want it.

This system could also be adapted for other languages, such as French, which likely has multiple accents, or perhaps Mandarin Chinese if there are differences in the accent between mainland China, Taiwan, and the United States. The system might also be adapted to translate from one language to another, utilizing a similar technique. Every word in the language in each of the received audio streams could be analyzed by parsing each word in the received audio. Then each word would be translated into the selected language, and an output stream of the translated version would be sent to the users who want it.

The translation of accents or languages could be done either through a computer program, or alternatively through live human translators.

The benefit of people receiving information in their native accent or language would be that they understand the information in a clearer way. Especially when it comes to technical terms, sometimes foreign languages and accents can use very different terms, so hearing the information in the user's preferred accent or language might be very beneficial in a technical conversation.

Figure 7:
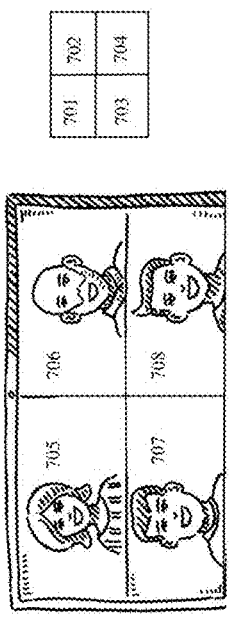
FIG. 7 is a drawing showing how the user can change their status as a presenter within the meeting, according to various embodiments of the present disclosure.

In FIG. 7, one embodiment of the invention is displayed as a drawing showing how the user can change their status as a presenter within the meeting.

Figure 8:
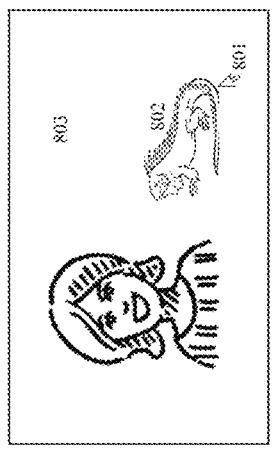
FIG. 8 is a drawing showing how the present invention can identify an object seen in the background or any portion of the video of a user, according to various embodiments of the present disclosure.

In FIG. 8, one embodiment of the invention is displayed as a drawing showing how the present invention can identify an object seen in the background or any portion of the video of a user. Let's say another user is looking at video 803. The user wants to know what object 802 is, so the user moves their mouse to position 801, and clicks the mouse. A drop down menu is displayed wherein one option is to identify the object near the click. The user selects this option, and analysis is performed utilizing both a database and the internet. In this example, the result returned for object 802 is that it is an iguana.

Figure 9:
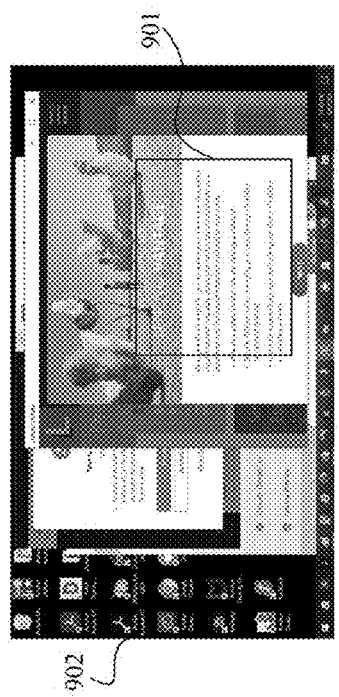
FIG. 9 is a drawing showing how the present invention can allow a user to select only a portion of the video on their screen in order to share it, according to various embodiments of the present disclosure.

In FIG. 9, one embodiment of the invention is displayed as a drawing showing how the present invention can allow a user to select only a portion of the video on their screen in order to share it. In this example, the user's screen 902 has a lot going on, but the user only wants to share part of it in their videoconference. As such the user selects the section they want to share, section 901, and then a drop down menu is displayed wherein one option is to only share the selection 901 in the videoconference. The user selects this option, and then only that portion of the screen is shared in the videoconference.

In FIG. 10, one embodiment of the invention is displayed as a drawing showing different ways that the video of multiple users can be synced, such that the users can appear in different positions compared to their actual positions. For example, image 1001 shows the users sitting next to each other and looking at a shared display. This may be a screen that is shared by a presented in the video conference. This way, it appears that all the users are looking at the shared screen, just as they might in a real conference room. This provides more realism in the sense that the users are more likely to feel that a meeting is actually occurring.

It's also possible that machine learning algorithms could be utilized to analyze whether each participant is actually looking at the shared screen, in order to determine whether each user is paying attention. Perhaps in the event a user is not paying attention, the user receives an automated message reminding them to look at the shared screen.

Another example is image 2002, in which the users can be shown sitting next to each other on couches by showing their video screens next to each other on images of couches. It's possible that users can select which group they'd like to be with, so that each couch is comprised of users who chose to be with those other users on the same couch. These users might all be watching some sort of performance, perhaps musical or otherwise, that is taking place in the middle of the screen. This way, users can get the full concert going experience, in the sense that they can sit with their friends, and they can all witness a performance together.

Although there are only 3 couches in image 2002, alternatively there could be limitless couches arranged around whatever performance is displayed in the center, allowing very large gatherings to have a shared experience.

In another embodiment of the invention, the invention is a system that provides video conferencing, comprising: an option to modify an accent of a user from an original accent to a preferred accent of another user; an option to merge live video streams of each user into one viewable stream such that each user appears sitting next to each other with a variety of possible backgrounds and seats; an option for each user to only share part of their screen as opposed to their whole screen; an option for each user to change the clothing of each user such that it appears the user is wearing different clothing of their choice; an option for each user to choose the frame that each user is displayed in, such that the user is not stuck in a frame that the user does not want to be in; and an option for each user to display a video on loop instead of the user's realtime video, so that the other users only see the video on loop and do not see the user's realtime video.

In another embodiment of the invention, the invention is a system that provides video conferencing, comprising: an option to modify an accent of a user from an original accent to a preferred accent of another user; an option to merge live video streams of each user into one viewable stream such that each user appears sitting next to each other with a variety of possible backgrounds and seats; an option for each user to only share part of their screen as opposed to their whole screen; an option for each user to change the clothing of each user such that it appears the user is wearing different clothing of their choice; an option for each user to choose the frame that each user is displayed in, such that the user is not stuck in a frame that the user does not want to be in; and an option for each user to display a video on loop instead of the user's realtime video, so that the other users only see the video on loop and do not see the user's realtime video; the option to modify an accent of a user from an original accent to a preferred accent of another user including the following accents as either the original accent or the preferred accent: Australian English; American English; British English; Indian English; French from France; African French; Portuguese from Portugal; Brazilian Portuguese; Mandarin Chinese from mainland China; Mandarin Chinese from Taiwan; Mandarin Chinese from America; Spanish from Spain; Spanish from Mexico; Spanish from Central America; and Spanish from South America.

In another embodiment of the invention, the invention is a system that provides video conferencing, comprising: an option to modify an accent of a user from an original accent to a preferred accent of another user; an option to merge live video streams of each user into one viewable stream such that each user appears sitting next to each other with a variety of possible backgrounds and seats; an option for each user to only share part of their screen as opposed to their whole screen; an option for each user to change the clothing of each user such that it appears the user is wearing different clothing of their choice; an option for each user to choose the frame that each user is displayed in, such that the user is not stuck in a frame that the user does not want to be in; and an option for each user to display a video on loop instead of the user's realtime video, so that the other users only see the video on loop and do not see the user's realtime video; the option to merge live video streams of each user into one viewable stream such that each user appears sitting next to each other with the following potential backgrounds and seats: couch, wherein the couch is of a color selected by a user; seats around a rectangular conference table, wherein the table is of a color selected by a user; seats around a circular conference table, wherein the table is of a color selected by a user; seats in a movie theater, wherein the seats are of a color selected by a user; seats around a patio table outdoors, wherein the patio table can be transparent or a color selected by a user; seats around a table, wherein the images of the seats and table have been uploaded by a user because a user wants customized images of seats and tables.

In another embodiment of the invention, the invention is a system that provides video conferencing, comprising: an option to modify an accent of a user from an original accent to a preferred accent of another user; an option to merge live video streams of each user into one viewable stream such that each user appears sitting next to each other with a variety of possible backgrounds and seats; an option for each user to only share part of their screen as opposed to their whole screen; an option for each user to change the clothing of each user such that it appears the user is wearing different clothing of their choice; an option for each user to choose the frame that each user is displayed in, such that the user is not stuck in a frame that the user does not want to be in; and an option for each user to display a video on loop instead of the user's realtime video, so that the other users only see the video on loop and do not see the user's realtime video; the option to merge live video streams of each user into one viewable stream such that each user appears sitting next to each other with the following potential backgrounds and seats: wherein the part of the body visible in the video of a user is shown, and then the rest of the body is displayed as a fixed image that is either a default image or an image chosen by the user.

In another embodiment of the invention, the invention is a system that provides video conferencing, comprising: an option to modify an accent of a user from an original accent to a preferred accent of another user; an option to merge live video streams of each user into one viewable stream such that each user appears sitting next to each other with a variety of possible backgrounds and seats; an option for each user to only share part of their screen as opposed to their whole screen; an option for each user to change the clothing of each user such that it appears the user is wearing different clothing of their choice; an option for each user to choose the frame that each user is displayed in, such that the user is not stuck in a frame that the user does not want to be in; and an option for each user to display a video on loop instead of the user's realtime video, so that the other users only see the video on loop and do not see the user's realtime video; an option to perform auto detection to identify an object seen in a videoconferencing session, wherein the object is selected by a user.

In another embodiment of the invention, the invention is a system that provides video conferencing, comprising: an option to modify an accent of a user from an original accent to a preferred accent of another user; an option to merge live video streams of each user into one viewable stream such that each user appears sitting next to each other with a variety of possible backgrounds and seats; an option for each user to only share part of their screen as opposed to their whole screen; an option for each user to change the clothing of each user such that it appears the user is wearing different clothing of their choice; an option for each user to choose the frame that each user is displayed in, such that the user is not stuck in a frame that the user does not want to be in; and an option for each user to display a video on loop instead of the user's realtime video, so that the other users only see the video on loop and do not see the user's realtime video; wherein a transcription of each user's statements creates a written record of each user's statements; wherein this written record is shown in a dialog box next to each user's realtime video; wherein this written record can optionally be converted into another language through machine translation.

In another embodiment of the invention, the invention is a system that provides video conferencing, comprising: an option to modify an accent of a user from an original accent to a preferred accent of another user; an option to merge live video streams of each user into one viewable stream such that each user appears sitting next to each other with a variety of possible backgrounds and seats; an option for each user to only share part of their screen as opposed to their whole screen; an option for each user to change the clothing of each user such that it appears the user is wearing different clothing of their choice; an option for each user to choose the frame that each user is displayed in, such that the user is not stuck in a frame that the user does not want to be in; and an option for each user to display a video on loop instead of the user's realtime video, so that the other users only see the video on loop and do not see the user's realtime video; wherein facial recognition is utilized in order to determine whether each user is paying attention to the meeting or not.

In another embodiment of the invention, the invention is a system that provides video conferencing, comprising: an option to modify an accent of a user from an original accent to a preferred accent of another user; an option to merge live video streams of each user into one viewable stream such that each user appears sitting next to each other with a variety of possible backgrounds and seats; an option for each user to only share part of their screen as opposed to their whole screen; an option for each user to change the clothing of each user such that it appears the user is wearing different clothing of their choice; an option for each user to choose the frame that each user is displayed in, such that the user is not stuck in a frame that the user does not want to be in; and an option for each user to display a video on loop instead of the user's realtime video, so that the other users only see the video on loop and do not see the user's realtime video; wherein facial recognition is utilized in order to determine whether each user is paying attention to the meeting or not; wherein the facial recognition analyzes the following aspects of each user's face: whether the cheeks are raised, the tightness of the lid, whether the lip corner is pulled, whether the upper lip is raised, and whether the lips are apart.

In another embodiment of the invention, the invention is a system that provides video conferencing, comprising: an option to modify an accent of a user from an original accent to a preferred accent of another user; an option to merge live video streams of each user into one viewable stream such that each user appears sitting next to each other with a variety of possible backgrounds and seats; an option for each user to only share part of their screen as opposed to their whole screen; an option for each user to change the clothing of each user such that it appears the user is wearing different clothing of their choice; an option for each user to choose the frame that each user is displayed in, such that the user is not stuck in a frame that the user does not want to be in; and an option for each user to display a video on loop instead of the user's realtime video, so that the other users only see the video on loop and do not see the user's realtime video; wherein facial recognition is utilized in order to determine whether each user is paying attention to the meeting or not; wherein the facial recognition analyzes the following aspects of expression intensity of each user's face: neutral, happy, sad, angry, surprised, scared, disgusted, and contempt.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "processor" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode), or OLED (organic light emitting diode) monitor, for displaying information to the user and a keyboard and a pointing device, e.g., a mouse or a trackball, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

From the foregoing, it will be appreciated that specific embodiments of the invention have been described herein for purposes of illustration, but that various modifications may be made without deviating from the spirit and scope of the invention. Accordingly, the invention is not limited except as by the appended claims.

The invention claimed is:

1. A system that provides video conferencing, comprising:
an option to modify an accent of a user from an original accent to a preferred accent of another user;
an option to merge live video streams of each user into one viewable stream such that each user appears sitting next to each other with a variety of possible backgrounds and seats;
an option for each user to only share part of their screen as opposed to their whole screen;
an option for each user to change the clothing of each user such that it appears the user is wearing different clothing of their choice;
an option for each user to choose the frame that each user is displayed in, such that the user is not stuck in a frame that the user does not want to be in;
an option for each user to display a video on loop instead of the user's realtime video, so that the other users only see the video on loop and do not see the user's realtime video;
the option to merge live video streams of each user into one viewable stream such that each user appears sitting next to each other with the following potential backgrounds and seats:
couch, wherein the couch is of a color selected by a user;
seats around a rectangular conference table, wherein the table is of a color selected by a user;
seats around a circular conference table, wherein the table is of a color selected by a user;
seats in a movie theater, wherein the seats are of a color selected by a user;
seats around a patio table outdoors, wherein the patio table can be transparent or a color selected by a user;
seats around a table, wherein the images of the seats and table have been uploaded by a user because a user wants customized images of seats and tables.

2. A method that provides video conferencing, comprising:
an option of modifying an accent of a user from an original accent to a preferred accent of another user;
an option of merging live video streams of each user into one viewable stream such that each user appears sitting next to each other with a variety of possible backgrounds and seats;
an option for each user to only share part of their screen as opposed to their whole screen;
an option for each user to change the clothing of each user such that it appears the user is wearing different clothing of their choice;
an option for each user to choose the frame that each user is displayed in, such that the user is not stuck in a frame that the user does not want to be in;
an option for each user to display a video on loop instead of the user's realtime video, so that the other users only see the video on loop and do not see the user's realtime video;
the option of merging live video streams of each user into one viewable stream such that each user appears sitting next to each other with the following potential backgrounds and seats:
couch, wherein the couch is of a color selected by a user;
seats around a rectangular conference table, wherein the table is of a color selected by a user;
seats around a circular conference table, wherein the table is of a color selected by a user;
seats in a movie theater, wherein the seats are of a color selected by a user;
seats around a patio table outdoors, wherein the patio table can be transparent or a color selected by a user;
seats around a table, wherein the images of the seats and table have been uploaded by a user because a user wants customized images of seats and tables.

3. A method that provides video conferencing, comprising:
an option of modifying an accent of a user from an original accent to a preferred accent of another user;
an option of merging live video streams of each user into one viewable stream such that each user appears sitting next to each other with a variety of possible backgrounds and seats;

an option for each user to only share part of their screen as opposed to their whole screen;

an option for each user to change the clothing of each user such that it appears the user is wearing different clothing of their choice;

an option for each user to choose the frame that each user is displayed in, such that the user is not stuck in a frame that the user does not want to be in;

and an option for each user to display a video on loop instead of the user's realtime video, so that the other users only see the video on loop and do not see the user's realtime video;

the option of modifying an accent of a user from an original accent to a preferred accent of another user including the following accents as either the original accent or the preferred accent:
Australian English;
American English;
British English;
Indian English;
French from France;
African French;
Portuguese from Portugal;
Brazilian Portuguese;
Mandarin Chinese from mainland China;
Mandarin Chinese from Taiwan;
Mandarin Chinese from America;
Spanish from Spain;
Spanish from Mexico;
Spanish from Central America; and
Spanish from South America;

the option of merging live video streams of each user into one viewable stream such that each user appears sitting next to each other with the following potential backgrounds and seats:
couch, wherein the couch is of a color selected by a user;
seats around a rectangular conference table, wherein the table is of a color selected by a user;
seats around a circular conference table, wherein the table is of a color selected by a user;
seats in a movie theater, wherein the seats are of a color selected by a user;
seats around a patio table outdoors, wherein the patio table can be transparent or a color selected by a user;
seats around a table, wherein the images of the seats and table have been uploaded by a user because a user wants customized images of seats and tables;

the option of merging live video streams of each user into one viewable stream such that each user appears sitting next to each other with the following potential backgrounds and seats:

wherein the part of the body visible in the video of a user is shown, and then the rest of the body is displayed as a fixed image that is either a default image or an image chosen by the user;

an option of automatically identifying an object seen in a videoconferencing session, wherein the object is selected by a user;

wherein a transcription of each user's statements is automatically created;

wherein the transcription is a written record of each user's statements;

wherein the written record is shown in a dialog box next to each user's realtime video;

wherein the written record can optionally be converted into another language through machine translation;

wherein facial recognition is utilized in order to determine whether each user is paying attention to the meeting or not;

wherein the facial recognition analyzes the following aspects of each user's face:
whether the cheeks are raised,
the tightness of the lid,
whether the lip corner is pulled,
whether the upper lip is raised,
and whether the lips are apart;

wherein the facial recognition further analyzes the following aspects of expression intensity of each user's face: neutral, happy, sad, angry, surprised, scared, disgusted, and contempt.

* * * * *